(12) United States Patent
Zhou et al.

(10) Patent No.: US 11,632,048 B2
(45) Date of Patent: Apr. 18, 2023

(54) POWER STATE-BASED VOLTAGE REGULATOR CIRCUIT AND METHOD

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Haohua Zhou, Fremont, CA (US); Tze-Chiang Huang, Saratoga, CA (US); Mei Hsu, Saratoga, CA (US); Yun-Han Lee, Baoshan Township (CN)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

(21) Appl. No.: 16/799,327

(22) Filed: Feb. 24, 2020

(65) Prior Publication Data

US 2021/0226537 A1    Jul. 22, 2021

(30) Foreign Application Priority Data

Jan. 22, 2020    (CN) .................... 202010075340.6

(51) Int. Cl.
*H02M 3/158*    (2006.01)
*H02M 3/157*    (2006.01)

(52) U.S. Cl.
CPC ......... *H02M 3/1584* (2013.01); *H02M 3/157* (2013.01); *H02M 3/1586* (2021.05)

(58) Field of Classification Search
None
See application file for complete search history.

(56) References Cited

U.S. PATENT DOCUMENTS

| 6,281,666 | B1 | 8/2001 | Tressler et al. |
| 7,109,691 | B2 * | 9/2006 | Brooks ............... H02M 3/1584 |
| | | | 323/272 |
| 2002/0057076 | A1 | 5/2002 | Hwang |
| 2002/0057082 | A1 * | 5/2002 | Hwang ................. H02M 3/158 |
| | | | 323/284 |
| 2004/0041543 | A1 | 3/2004 | Brooks et al. |

(Continued)

FOREIGN PATENT DOCUMENTS

| CN | 1398364 | 2/2003 |
| CN | 1451201 | 10/2003 |

(Continued)

OTHER PUBLICATIONS

Office Action dated Jul. 8, 2021 for corresponding case No. TW 11020652760. (pp. 1-7).

*Primary Examiner* — Jeffrey A Gblende
(74) *Attorney, Agent, or Firm* — Hauptman Ham, LLP

(57) ABSTRACT

A voltage regulator includes an output node, a control circuit, and a power stage. The control circuit is configured to receive a power state signal from a load circuit coupled to the output node, and output a control signal based on the power state signal. The power stage includes a plurality of phase circuits coupled to the output node and is configured to enable a phase circuit of the plurality of phase circuits responsive to the control signal.

20 Claims, 8 Drawing Sheets

(56) References Cited

U.S. PATENT DOCUMENTS

| | | | | |
|---|---|---|---|---|
| 2007/0097571 A1* | 5/2007 | Dinh | ............... | H02M 3/1584 |
| | | | | 361/62 |
| 2008/0303495 A1* | 12/2008 | Wei | ............... | G05F 3/04 |
| | | | | 323/272 |
| 2011/0194319 A1* | 8/2011 | Ishioka | ............... | H02M 7/493 |
| | | | | 363/71 |
| 2011/0254531 A1* | 10/2011 | Markowski | ............ | H02J 1/102 |
| | | | | 323/371 |
| 2015/0349762 A1 | 12/2015 | Kinder | | |

FOREIGN PATENT DOCUMENTS

| | | |
|---|---|---|
| CN | 101218736 | 7/2008 |
| CN | 103580477 | 2/2014 |
| CN | 103872915 | 6/2014 |
| CN | 105871208 | 8/2016 |
| CN | 110622097 | 12/2019 |
| TW | 200722951 | 6/2007 |
| TW | 201007411 | 2/2010 |
| TW | 201539959 | 10/2015 |
| TW | 201841092 | 11/2018 |

\* cited by examiner

POWER STATE-BASED VOLTAGE REGULATOR CIRCUIT AND METHOD

PRIORITY CLAIM

The present application claims priority to the China Patent Application No. 202010075340.6, filed Jan. 22, 2020, which is incorporated herein by reference in its entirety.

BACKGROUND

Voltage regulators are often employed to generate stable output voltage levels based on various power supply voltage inputs. In boost converter configurations, a direct current (DC) output voltage level is higher than a DC power supply voltage level and, in buck converter configurations, a DC output voltage level is lower than a DC power supply voltage level.

In some cases, voltage regulators include multiple phases, each phase supplying a load current for a given portion of an output period. Compared to single-phase voltage regulators, multi-phase arrangements can provide improved efficiency, faster transient response, and reduced output voltage ripple.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
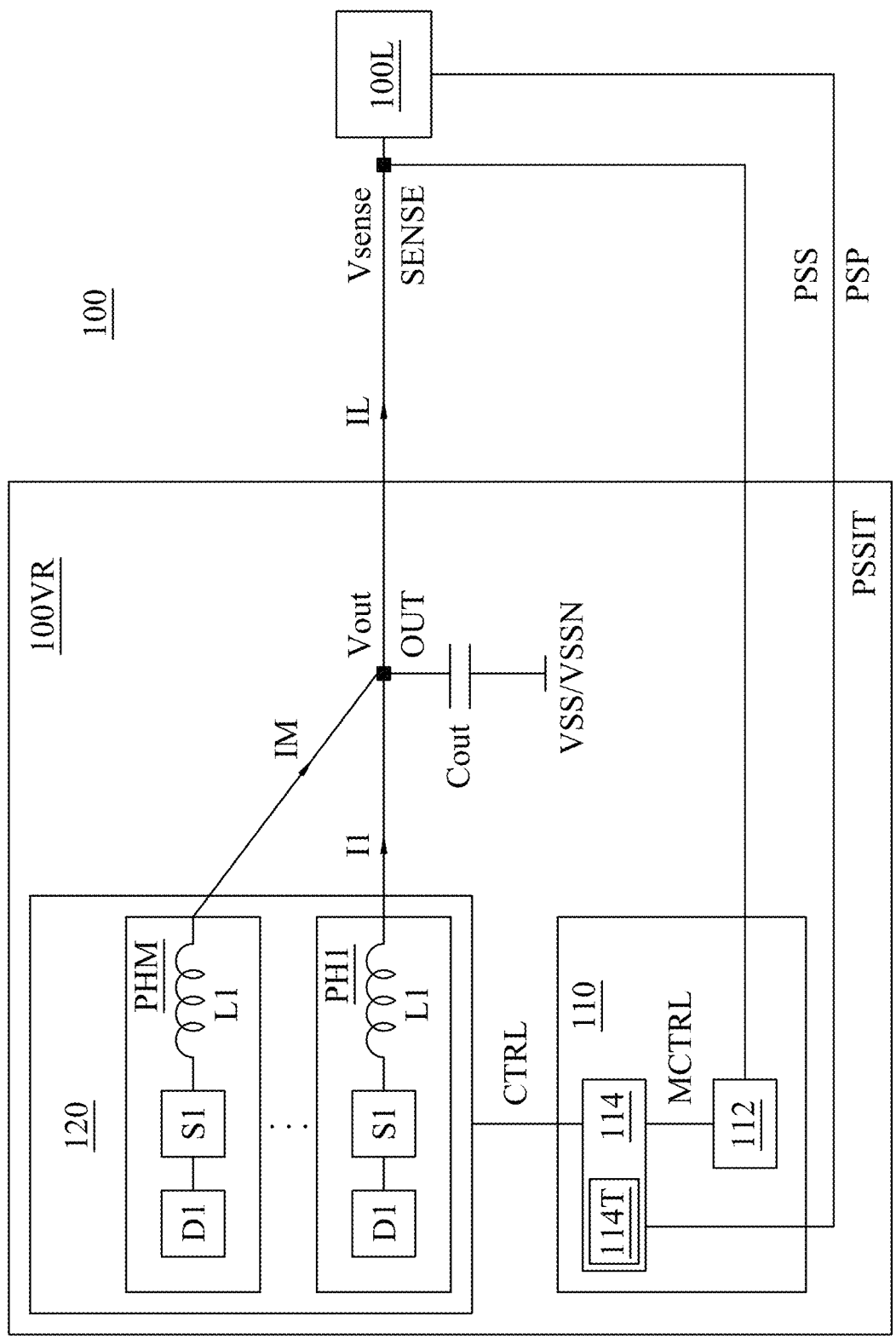
FIG. 1 is a schematic diagram of a voltage regulator circuit, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a voltage regulator receives a signal indicative of a power state of a load circuit and, in response, enables a predetermined number of phase circuits coupled to the load circuit. In some embodiments, a trim-based current balancing scheme is used to enable phase circuits of a voltage regulator. Compared to approaches in which current balancing and numbers of enabled phase circuits are based on monitoring output currents, voltage regulator complexity and response times are thereby reduced.

FIG. 1 is a schematic diagram of a voltage regulator circuit 100, in accordance with some embodiments. Voltage regulator circuit 100 includes a voltage regulator 100VR coupled to a load circuit 100L.

Two or more circuit elements are considered to be coupled based on a direct electrical connection or an electrical connection that includes one or more additional circuit elements, e.g., one or more logic or transmission gates, and is thereby capable of being controlled, e.g., made resistive or open by a transistor or other switching device.

In the embodiment depicted in FIG. 1, voltage regulator 100VR is directly connected to load circuit 100L through a node SENSE and through a signal path PSP. In various embodiments, one or more additional circuit elements, e.g., one or more switching devices, are coupled between one or more of voltage regulator 100VR and node SENSE, node SENSE and load circuit 100L, or voltage regulator 100VR and load circuit 100L along signal path PSP.

Voltage regulator 100VR is an electronic circuit configured as discussed below as a multi-phase, buck converter type voltage regulator including one or more input terminals (not shown in FIG. 1) configured to receive one or more power supply voltage levels and generate a voltage Vout at an output node OUT responsive to a voltage Vsense at node SENSE. Voltage regulator 100VR includes an input terminal PSSIT configured to receive a signal PSS on signal path PSP.

Load circuit 100L is an electronic circuit configured to operate in a plurality of power states, each power state corresponding to a value of load current IL output by voltage regulator 100VR, the values of load current IL ranging from a minimum load current value to a maximum load current value. Load circuit 100L is configured to generate signal PSS indicative of a particular power state of the plurality of power states. Signal PSS includes a plurality of voltage levels corresponding to logical states, each configuration of the plurality of voltage levels thereby being indicative of a corresponding power state of the plurality of power states. In various embodiments, signal PSS includes one or both of a parallel or serial configuration of the voltage levels.

In some embodiments, the power states and load current values have a one-to-one correspondence such that a particular load current value uniquely applies to the power state indicated by signal PSS. In some embodiments, a number of power states exceeds a number of load current values such that a particular load current value applies to more than one power state indicated by signal PSS. In some embodiments, signal PSS is configured to indicate load current values such that a particular configuration of the plurality of voltage levels indicates a load current value or range of values capable of corresponding to more than one power state of load circuit 100L.

In some embodiments, load circuit 100L includes a plurality of electronic circuits. In some embodiments, load circuit 100L includes some or all of a system on a chip (SOC). In some embodiments, power states indicated by signal PSS correspond to SOC operating modes, e.g., one or more of a sleep mode, a standby mode, a partially activated mode, a fully activated mode, or a high-performance mode.

In some embodiments, load circuit 100L is included in a first integrated circuit (IC) die, and some or all of voltage regulator 100VR is included in one or more IC dies in addition to the first IC die. In some embodiments, load circuit 100L and some or all of voltage regulator 100VR are included in a same IC die.

Voltage regulator 100VR includes a control circuit 110 coupled to a power stage 120, and a capacitor Cout coupled between output node OUT and a power supply reference node VSSN, configured to carry a power supply reference voltage level, e.g., ground.

Control circuit 110 is an electronic circuit configured to receive signal PSS and generate a control signal CTRL based on signal PSS as discussed below. In various embodiments, control circuit 110 includes one or a combination of one or more processors, one or more logic circuits, one or more memory circuits, or the like.

In various embodiments control signal CTRL includes a plurality of voltage levels corresponding to logical states, each configuration of the plurality of voltage levels corresponding to a particular configuration of power stage 120 as discussed below. In various embodiments, control signal CTRL includes one or both of a parallel or serial configuration of the voltage states. In some embodiments, control signal CTRL includes one or more pulse width modulation (PWM) signals.

Power stage 120 is an electronic circuit including a number M of phase circuits PH1-PHM, also referred to as phases in some embodiments. Each phase circuit PH1-PHM is configured to generate and output a corresponding one of currents I1-IM to output node OUT. Power stage 120 is configured to receive control signal CTRL and enable one or more of phase circuits PH1-PHM based on control signal CTRL, thereby generating a corresponding one or more of currents I1-IM based on control signal CTRL in operation.

In some embodiments, power stage 120 includes the number M of phase circuits PH1-PHM ranging from two to sixteen. In some embodiments, power stage 120 includes the number M of phase circuits PH1-PHM ranging from four to eight. In some embodiments, power stage 120 includes the number M of phase circuits PH1-PHM greater than sixteen. In some embodiments, power stage 120 does not include some or all of phase circuits PH1-PHM, and power stage 120 is otherwise configured to generate one or more of currents I1-IM based on control signal CTRL.

Each phase circuit PH1-PHM includes one or more driver circuits D1, one or more power switches S1, and an inductor L1. Driver circuits, e.g., the one or more driver circuits D1, are electronic circuits configured to receive some or all of control signal CTRL, and output one or more driver voltages (not shown in FIG. 1) responsive to control signal CTRL. In some embodiments, a driver circuit includes one or more logic gates.

The one or more power switches S1 are coupled between node VSSN and a power supply node (not shown in FIG. 1) configured to carry the one or more power supply voltage levels. Each power switch S1 is configured to receive one of the driver voltages, and, responsive to the driver voltage, selectively couple and decouple a first terminal of inductor L1 to and from one of the power supply node or node VSSN. A second terminal of inductor L1 is coupled to output node OUT.

In various embodiments, with respect to one or more of phase circuits PH1-PHM, at least one of the one or more driver circuits D1, the one or more power switches S1, or inductor L1 is a discrete device separate from one or both of the other one or more of the one or more driver circuits D1, the one or more power switches S1, or inductor L1. In various embodiments, with respect to one or more of phase circuits PH1-PHM, each of the one or more driver circuits D1, the one or more power switches S1, and inductor L1 is included in a same IC die. In some embodiments, the same IC die includes inductor L1 including an on-chip magnetic inductor.

In some embodiments, control circuit 110 and load circuit 100L are included in a first IC die, and one or more of phase circuits PH1-PHM are included in one or more corresponding IC dies in addition to the first IC die. In some embodiments, the one or more additional dies correspond to a first IC manufacturing process based on a first feature size, and the first IC die corresponds to a second IC manufacturing process based on a second feature size smaller than the first feature size.

Each phase circuit PH1-PHM is thereby configured to, responsive to some or all of control signal CTRL in operation, generate the corresponding one of currents I1-IM having either of two polarities based on one or more power switches S1 being closed for one or more predetermined durations in an enabled state, or having a substantially zero magnitude based on each of the one or more power switches S1 being open in a disabled state. Each phase circuit PH1-PHM is thereby capable of charging and discharging, through inductor L1, a first terminal of capacitor Cout coupled to output node OUT in the enabled state, and being electrically neutral with respect to the first terminal of capacitor Cout in the disabled state.

Control circuit 110 includes a signal generator 112 coupled to a phase control block 114. Signal generator 112 is an electronic circuit configured to receive voltage Vsense and, based on voltage Vsense, generate a master control signal MCTRL configured to enable each of phase circuits PH1-PHM for a predetermined portion, or phase, of a signal period such that currents I1-IM sequentially charge and/or discharge capacitor Cout, thereby collectively supplying load current IL while regulating voltage Vout on output node OUT, in operation.

Phase control block 114 is an electronic circuit configured to receive master control signal MCTRL from signal generator 112 and signal PSS from input terminal PSSIT, and, based on signal PSS, output a predetermined portion or all of master control signal MCTRL as control signal CTRL. The predetermined portion or all of master control signal MCTRL output as control signal CTRL is configured to enable a predetermined subset or all of phase circuits PH1-PHM.

In some embodiments, signal generator 112 is configured to generate master control signal MCTRL as a plurality of M signals or signal pairs, e.g., PWM signals, each signal or signal pair corresponding to one of phase circuits PH1-PHM. In the case of M signal pairs, each pair of the plurality of signal pairs includes a first signal configured to cause a first power switch S1 to selectively couple the first terminal of inductor L1 to the power supply node and a second signal configured to cause a second power switch S1 to selectively couple the first terminal of inductor L1 to node VSSN.

In such embodiments, phase control block 114 is configured to output the predetermined portion or all of master control signal MCTRL as control signal CTRL by coupling the corresponding subset or all of phase circuits PH1-PHM to signal generator 112, and decoupling any remaining phase circuits PH1-PHM from signal generator 112, phase control block 114 thereby being configured as a phase gating circuit.

In operation, currents I1-IM output from phase circuits PH1-PHM contribute corresponding portions of load current IL such that the number of the predetermined subset or all of phase circuits PH1-PHM corresponds to a predetermined load current value of load current IL. Because signal PSS is indicative of one or more power states of load circuit 100L, control circuit 110 is thereby configured to, in operation, output control signal CTRL enabling the predetermined subset or all of phase circuits PH1-PHM matching the load current IL corresponding to the one or more power states of load circuit 100L indicated by signal PSS.

In some embodiments, phase control block 114 is configured to output the predetermined portion or all of master control signal MCTRL as control signal CTRL based on a table 114T of phase circuits PH1-PHM mapped to power states of load circuit 100L, as indicated by signal PSS. In various embodiments, table 114T is included in phase control block 114 or in a circuit (not shown) other than phase control block 114.

In various embodiments, table 114T is stored in a memory, e.g., a non-volatile memory (NVM), and/or includes one or more logic gates configured to receive some or all of signal PSS and provide one or more signals usable to output the predetermined portion or all of master control signal MCTRL as control signal CTRL.

In some embodiments, voltage regulator 100VR includes one or more input terminals (not shown), in addition to input terminal PSSIT, configured to receive one or more signals configured to cause table 114T to be stored in voltage regulator 100VR, e.g., in phase control block 114. In some embodiments, load circuit 100L is configured to generate information usable to create and/or store table 114T in voltage regulator 100VR, and voltage regulator 100VR is configured to receive the information generated by load circuit 100L.

By the configuration discussed above, voltage regulator 100VR is capable of controlling the number of phase circuits PH1-PHM that are enabled based on signal PSS. In some embodiments, voltage regulator 100VR is otherwise configured, e.g., by including phase control block 114 within signal generator 112, so as to be capable of controlling the number of phase circuits PH1-PHM that are enabled based on signal PSS. By being configured to control the number of enabled phase circuits PH1-PHM based on signal PSS, voltage regulator 100VR is capable of responding to load variations more quickly than voltage regulators that control a number of enabled phase circuits based on feedback from one or more monitored currents.

By the configuration discussed above, voltage regulator 100VR is further capable of controlling the enabled number of phase circuits PH1-PHM independently of a monitored current, e.g., load current IL or some or all of currents I1-IM.

In some embodiments, voltage regulator 100VR is free from including a circuit configured to monitor one or more of currents I1-IM or load current IL. Voltage regulator 100VR is thereby capable of having a reduced complexity compared to approaches in which a number of enabled phase circuits is based on monitoring one or more output currents.

Figure 2A:
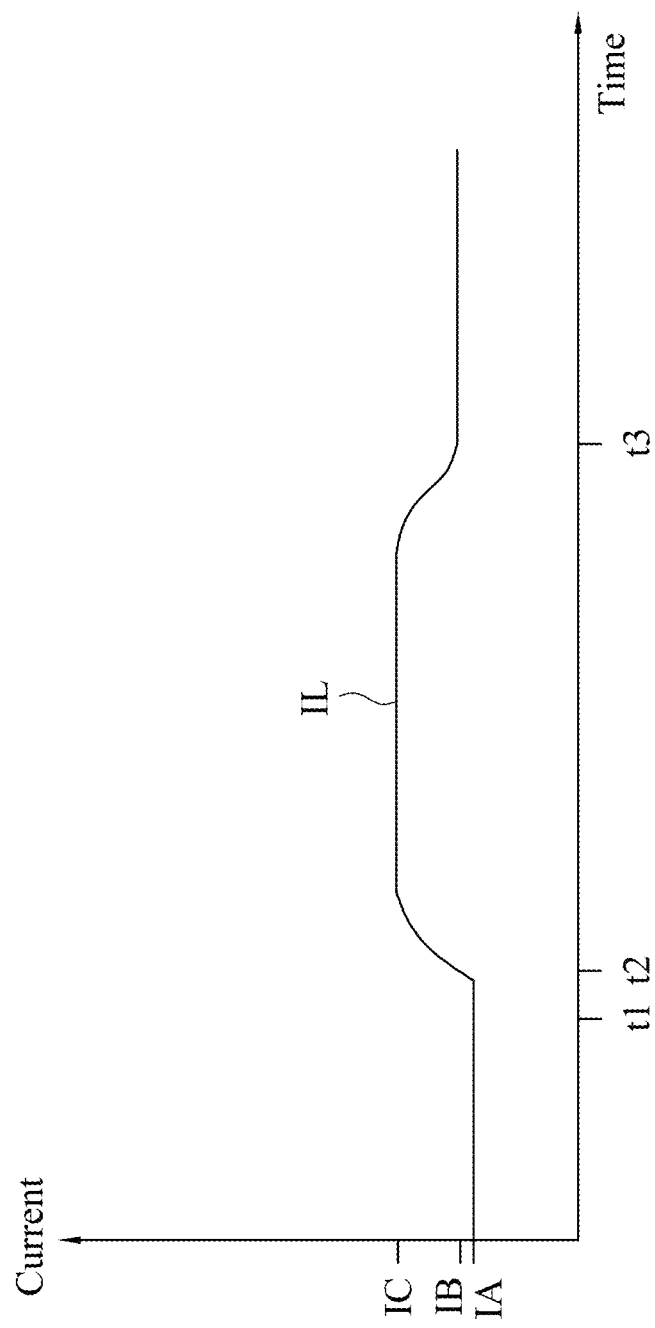
FIG. 2A is a representation of a voltage regulation sequence, in accordance with some embodiments.

FIG. 2A is a representation of a voltage regulation sequence, in accordance with some embodiments. FIG. 2A depicts a non-limiting example of load current IL of load circuit 100L, discussed above with respect to FIG. 1, as a function of time. Current IL is plotted on a graph including Time as the independent variable and Current as the dependent variable.

Prior to a time t1, load current IL has a load current value IA, and load circuit 100L outputs signal PSS indicative of a corresponding first power state of load circuit 100L. In response to signal PSS indicating the first power state, control circuit 110 of voltage regulator 100VR outputs control signal CTRL configured to enable a single one of phase circuits PH1-PHM.

At time t1, load circuit 100L initiates a transition to a second power state as indicated by signal PSS. In response to signal PSS indicating the second power state, control circuit 110 outputs control signal CTRL configured to enable a total of eight of phase circuits PH1-PHM.

From time t1 to a time t2, load current Il remains at load current value IA, reflecting a response time of load circuit 100L between the initiation of the second power state and an actual increase in load current IL corresponding to the second power state. Subsequent to time t2, load current IL ramps up to a load current value IC greater than load current value IA.

Because control circuit 110 outputs control signal CTRL in response to signal PSS, voltage regulator 100VR increases from a single enabled one of phase circuits PH1-PHM to eight enabled phase circuits PH1-PHM prior to load current IL ramping up to load current value IC. Voltage regulator 100VR is thereby capable of supplying load current IL having load current value IC prior to the actual increase in load current IL, and avoids power droops that could otherwise occur in approaches in which phases are enabled based on measured load currents.

At a time t3, load circuit 100L transitions to a third power state corresponding to load current IL decreasing to a load current value IB less than load current value IC and greater than load current value IA, as indicated by signal PSS. In response to signal PSS indicating the third power state, control circuit 110 outputs control signal CTRL configured to enable a total of two of phase circuits PH1-PHM.

Because control circuit 110 outputs control signal CTRL in response to signal PSS, voltage regulator 100VR decreases from eight enabled phase circuits PH1-PHM to two enabled phase circuits PH1-PHM sooner than in approaches in which phases are enabled based on measured load currents, thereby reducing power compared to such approaches.

Figure 2B:
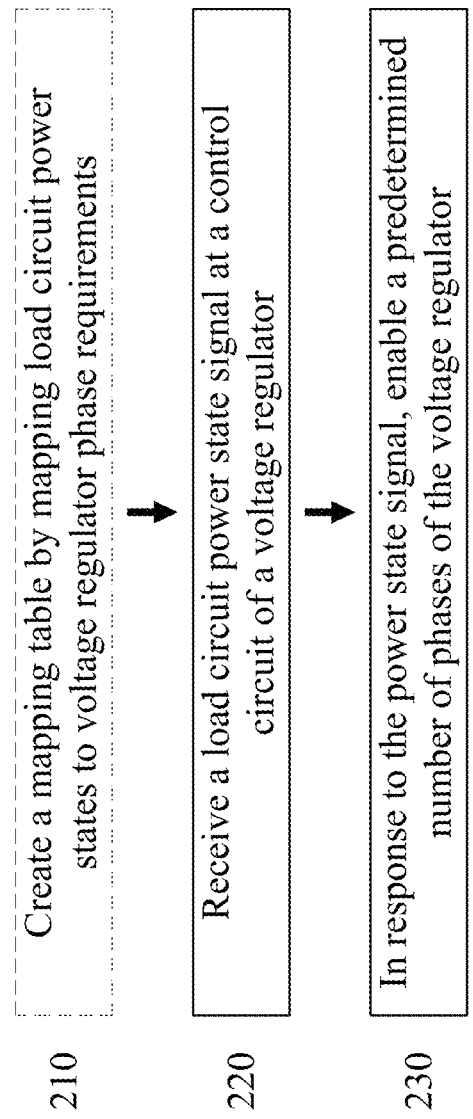
FIG. 2B is a flowchart of a method of regulating a voltage, in accordance with some embodiments.

FIG. 2B is a flowchart of a method 200 of regulating a voltage, in accordance with one or more embodiments. Method 200 is usable with a voltage regulator circuit including a multi-phase voltage regulator, e.g., voltage regulator circuit 100 including voltage regulator 100VR discussed above with respect to FIG. 1, or a voltage regulator circuit 300 including a voltage regulator 300VR discussed below with respect to FIGS. 3-6.

The sequence in which the operations of method 200 are depicted in FIG. 2B is for illustration only; the operations of method 200 are capable of being executed in sequences that differ from that depicted in FIG. 2B. In some embodiments, operations in addition to those depicted in FIG. 2B are performed before, between, during, and/or after the operations depicted in FIG. 2B. In some embodiments, the operations of method 200 are a subset of operations of a method of operating an SOC.

At operation 210, in some embodiments, a mapping table is created by mapping load circuit power states to voltage regulator phase requirements. Mapping the load circuit power states to the voltage regulator phase requirements includes each load circuit power state corresponding to a load current value of the voltage regulator. In various embodiments, a single load circuit power state corresponds to a given load current value, and/or multiple load circuit power states correspond to one or more other load current values.

Mapping the load circuit power states to the voltage regulator phase requirements includes determining a number of enabled phases corresponding to each load circuit power state. In some embodiments, determining the number of enabled phases corresponding to a given load circuit power state includes determining a multiple of a predetermined current per phase of the voltage regulator such that the number of enabled phases multiplied by the predetermined current per phase is greater than or equal to the load current value corresponding to the load circuit power state. In some embodiments, the predetermined current per phase is a maximum current per phase.

In some embodiments, creating the mapping table includes mapping power states of an SOC to the voltage regulator phase requirements. In some embodiments, mapping the power states of the SOC includes mapping the power states corresponding to one or more of a sleep mode, a standby mode, a partially activated mode, a fully activated mode, or a high-performance mode.

In some embodiments, creating the mapping table includes creating the mapping table by performing a simulation of the load circuit. In some embodiments, performing the simulation of the load circuit includes executing an SOC design tool, e.g., a prime time power comparator (PTPX). In some embodiments, creating the mapping table includes creating the mapping table by performing one or more power and/or current measurements of the load circuit and/or the voltage regulator.

In some embodiments, creating the mapping table includes storing the mapping table in the voltage regulator. In some embodiments, creating the mapping table includes mapping the power states of a load circuit configured to receive an output voltage of the voltage regulator in which the mapping table is stored. In some embodiments, creating the mapping table includes creating table 114T discussed above with respect to FIG. 1.

At operation 220, a load circuit power state signal is received at a control circuit of the voltage regulator. Receiving the load circuit power state signal includes receiving a plurality of voltage levels corresponding to logical states. In various embodiments, receiving the plurality of voltage levels includes receiving one or both of a parallel or serial configuration of the voltage levels.

Receiving the power state signal includes receiving the power state signal including an indication of one or more power levels of the load circuit configured to receive the output voltage of the voltage regulator.

In some embodiments, receiving the power state signal at the control circuit of the voltage regulator includes receiving signal PSS at control circuit 110, discussed above with respect to FIG. 1 and below with respect to FIG. 3.

At operation 230, in response to the power state signal, a predetermined number of phases of the voltage regulator is enabled. Enabling the predetermined number of phases of the voltage regulator includes enabling a predetermined subset or all of the phases of the voltage regulator.

In some embodiments, enabling the predetermined number of phases of the voltage regulator includes retrieving the predetermined number from the mapping table based on the power state signal. In some embodiments, retrieving the predetermined number from the mapping table includes the predetermined number multiplied by the predetermined current per phase of the voltage regulator being greater than or equal to the load current level indicated by the power state signal. In some embodiments, retrieving the predetermined number from the mapping table includes retrieving the predetermined number from table 114T discussed above with respect to FIG. 1.

In some embodiments, enabling the predetermined number of phases of the voltage regulator includes enabling one or more of phase circuits PH1-PHM discussed above with respect to FIG. 1. In some embodiments, enabling the predetermined number of phases of the voltage regulator includes performing a control signal gating function, e.g., as discussed above with respect to phase control block 114 and FIG. 1.

In some embodiments, enabling the predetermined number of phases of the voltage regulator includes executing one or more operations of a method 700, discussed below with respect to FIG. 7.

By executing some or all of the operations of method 200, a voltage regulator enables a predetermined number of phases in response to a power state signal indicative of a power state of a load circuit, thereby obtaining the benefits discussed above with respect to voltage regulator circuit 100 and FIG. 1.

Figure 3:
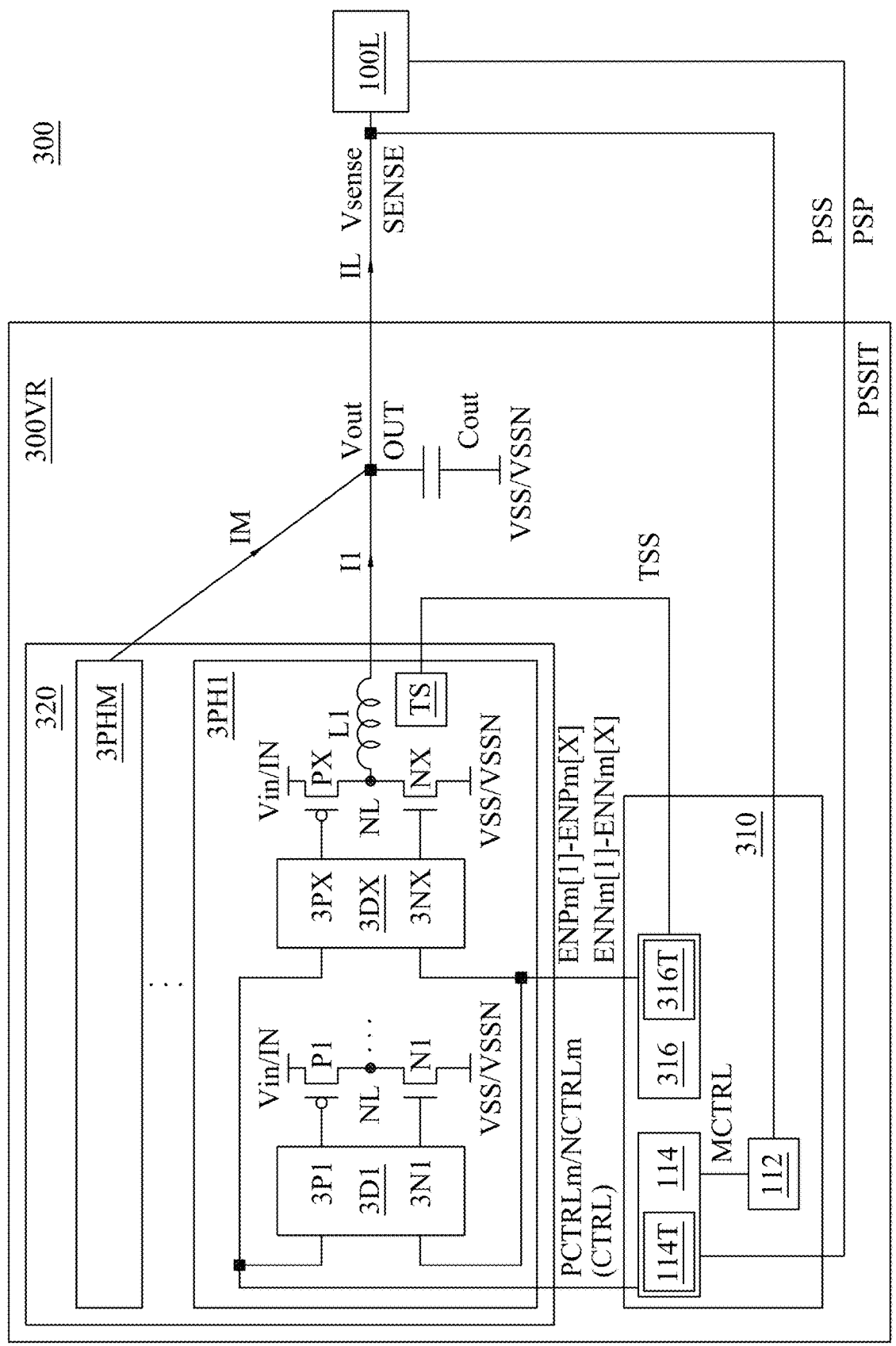
FIG. 3 is a schematic diagram of a voltage regulator circuit, in accordance with some embodiments.

FIG. 3 is a schematic diagram of voltage regulator circuit 300, in accordance with some embodiments. Voltage regulator circuit 300 includes load circuit 100L, signal path PSP, and node SENSE, each discussed above with respect to FIG. 1, and voltage regulator 300VR. Voltage regulator 300VR includes output node OUT, capacitor Cout, power supply reference node VSSN, and input terminal PSSIT, each discussed above with respect to FIG. 1, and a control circuit 310 coupled to a power stage 320.

Control circuit 310 includes signal generator 112 and phase control block 114 configured to receive signal PSS and generate control signal CTRL, each discussed above with respect to FIG. 1, and a signal generator 316, discussed below. Power stage 320 includes phase circuits 3PH1-3PHM, each phase circuit 3PH1-3PHM being configured to generate and output a corresponding one of currents I1-IM to output node OUT responsive to control signal CTRL as discussed above with respect to phase circuits PH1-PHM and FIG. 1, and as further discussed below.

In some embodiments, control circuit 310 does not include one or both of signal generator 112 or phase control block 114, and control circuit 310 is otherwise configured to generate control signal CTRL. In various embodiments, control circuit 310 is configured to generate control signal CTRL configured to enable a subset or all of phase circuits 3PH1-3PHM other than by receiving signal PSS, or is configured to continuously enable all of phase circuits 3PH1-3PHM.

In the embodiment depicted in FIG. 3, control circuit 310 is configured to output control signal CTRL as a predetermined subset or all of a plurality of pairs of control signals PCTRL1-PCTRLM and NCTRL1-NCTRLM, each pair of the plurality of pairs corresponding to a given one of phase circuits 3PH1-3PHM. In some embodiments, control circuit 310 is configured to output each control signal PCTRL1-PCTRLM and NCTRL1-NCTRLM of the predetermined subset or all of the plurality of pairs of control signals PCTRL1-PCTRLM and NCTRL1-NCTRLM as a PWM signal.

Each of phase circuits 3PH1-3PHM includes inductor L1 and node VSSN, each discussed above with respect to FIG. 1, a node IN configured to receive a power supply voltage Vin, a node NL coupled to a first terminal of inductor L1, a number X of driver circuits 3D1-3DX, the number X of p-type transistors P1-PX, and the number X of n-type transistors N1-NX.

In the embodiment depicted in FIG. 3, each of phase circuits 3PH1-3PHM includes a thermal sensor TS. Thermal sensors TS are electronic or electromechanical devices capable of collectively generating a sensor signal TSS indicative of temperatures of phase circuits 3PH1-3PHM, as further discussed below. In some embodiments, each of phase circuits 3PH1-3PHM does not include thermal sensor TS.

For a given one of phase circuits 3PH1-3PHM, each of driver circuits 3D1-3DX is configured to receive control signal pair PCTRLm/NCTRLm, a corresponding one of enable signals ENPm[1]-ENPm[X], and a corresponding one of enable signals ENNm[1]-ENNm[X], wherein m corresponds to the given one of the 1 . . . M phase circuits 3PH1-3PHM. Each of driver circuits 3D1-3DX is configured to generate a corresponding one of driver voltages DP1-DPX responsive to control signal PCTRLm and the corresponding one of enable signals ENPm[1]-ENPm[X], and to generate a corresponding one of driver voltages DN1-DNX responsive to control signal NCTRLm and the corresponding one of enable signals ENNm[1]-ENNm[X].

P-type transistors P1-PX are configured to receive respective driver voltages DP1-DPX, and selectively couple and decouple node NL to and from node IN responsive to driver voltages DP1-DPX. N-type transistors N1-NX are configured to receive respective driver voltages DN1-DNX, and selectively couple and decouple node NL to and from node VSSN responsive to driver voltages DN1-DNX. P-type transistors P1-PX are thereby coupled in parallel between nodes IN and NL, and n-type transistors N1-NX are thereby coupled in parallel between nodes NL and VSSN. Each of p-type transistors P1-PX and n-type transistors N1-NX is thereby configured to couple node NL to corresponding node IN or VSSN through a source-drain resistance Rds (not labeled).

Driver circuits 3D1-3DX are thereby configured to, responsive to control signal PCTRLm, selectively couple node NL to node IN through a predetermined subset or all of p-type transistors P1-PX, the predetermined subset or all of p-type transistors P1-PX being controlled by enable signals ENPm[1]-ENPm[X].

By controlling a number of parallel p-type transistors P1-PX used to couple node NL to node IN, driver circuits 3D1-3DX are capable of controlling a value of a node IN coupling resistance equal to an equivalent resistance of the resistances Rds of the subset or all of p-type transistors P1-PX coupled in parallel between nodes NL and IN.

In various embodiments, each of p-type transistors P1-PX has a same nominal value of resistance Rds, or p-type transistors P1-PX have one or more nominal values of resistance Rds different from one or more other nominal values of resistance Rds. In some embodiments, each one of p-type transistors P1-PX has a unique nominal value of resistance Rds. In some embodiments, p-type transistors P1-PX have nominal resistance Rds values given by $R_0 \times 2^{(x-1)}$, wherein $R_0$ is a smallest nominal resistance Rds value and x corresponds to the given one of the 1 . . . X p-type transistors P1-PX, the nominal resistance Rds values thereby corresponding to a binary weighting scheme.

Driver circuits 3D1-3DX are thereby also configured to, responsive to control signal NCTRLm, selectively couple node NL to node VSSN through a predetermined subset or all of n-type transistors N1-NX, the predetermined subset or all of n-type transistors N1-NX being controlled by enable signals ENNm[1]-ENNm[X].

By controlling a number of parallel n-type transistors N1-NX used to couple node NL to node VSSN, driver circuits 3D1-3DX are capable of controlling a value of a node VSSN coupling resistance equal to an equivalent resistance of the resistances Rds of the subset or all of n-type transistors N1-NX coupled in parallel between nodes NL and VSSN.

In various embodiments, each of n-type transistors N1-NX has a same nominal value of resistance Rds, or n-type transistors N1-NX have one or more nominal values of resistance Rds different from one or more other nominal values of resistance Rds. In some embodiments, each one of n-type transistors N1-NX has a unique nominal value of resistance Rds. In some embodiments, n-type transistors N1-NX have nominal resistance Rds values corresponding to the binary weighting scheme discussed above with respect to p-type transistors P1-PX.

Driver circuits 3D1-3DX, corresponding p-type transistors P1-PX, and corresponding n-type transistors N1-NX are thereby configured as X segments of a given phase circuit 3PH1-3PHM. The X segments of a given phase circuit 3PH1-3PHM are thereby configured to be collectively enabled and disabled responsive to the corresponding control signal pair PCTRLm/NCTRLm. In some embodiments, control signal pair PCTRLm/NCTRLm includes PWM signals configured to enable the given phase circuit 3PH1-3PHM by controlling duty cycles of p-type transistors P1-PX and n-type transistors N1-NX, thereby controlling durations in which node NL is coupled to either of nodes IN or VSSN, and dead-times in which node NL is coupled to neither node IN nor node VSSN.

As discussed above, each individual segment of the given phase circuit 3PH1-3PHM is thereby configured to be further individually enabled and disabled responsive to enable signals ENPm[1]-ENPm[X] and ENNm[1]-ENNm[X]. Phase circuits 3PH1-3PHM are thereby capable of being configured in a trim-based current balancing scheme, as further discussed below.

Signal generator 316 is an electronic circuit configured to generate enable signals ENPm[1]-ENPm[X] and ENNm[1]-ENNm[X] for each value of m from 1 to M having voltage levels corresponding to logical states such that driver circuits 3D1-3DX of each of power phase circuits 3PH1-3PHM generate driver voltages DP1-DPX and DN1-DNX responsive to the corresponding control signal pair PCTRLm/NCTRLm as discussed above.

Control circuit 310 including signal generator 316 and power stage 320 including phase circuits 3PH1-3PHM are thereby configured to control the values of the node IN and node VSSN coupling resistances for each of phase circuits 3PH1-3PHM. In operation, each of phase circuits 3PH1-3PHM generates a corresponding one of currents I1-IM by coupling inductor L1 in series with either the node IN coupling resistance or the node VSSN coupling resistance such that the value of the corresponding node IN or VSSN coupling resistance is added to a DC resistance value of inductor L1.

The node IN coupling resistance added to the DC resistance value of inductor L1 corresponds to a total IN-OUT resistance of a given one of phase circuits 3PH1-3PHM, and the node VSSN coupling resistance added to the DC resistance value of inductor L1 corresponds to a total VSSN-OUT resistance of a given one of phase circuits 3PH1-3PHM. A magnitude of a given one of currents I1-IM therefore has a value either based on a difference between voltages Vin and Vout divided by the corresponding IN-OUT resistance value or based on a difference between voltages VSS and Vout divided by the corresponding VSSN-OUT resistance value.

Based on power stage 320 being configured to control the values of the node IN and node VSSN coupling resistances for each of phase circuits 3PH1-3PHM, control circuit 310 is configured to control the magnitudes of each of currents I1-IM through configurations of enable signals ENPm[1]-ENPm[X] and ENNm[1]-ENNm[X] (1≤m≤M). For each of the IN-OUT and VSSN-OUT resistances of phase circuits 3PH1-3PHM, a minimum default resistance value corresponds to all of the corresponding transistors being enabled by the corresponding enable signals ENPm[1]-ENPm[X] or ENNm[1]-ENNm[X] (1≤m≤M). As the number of transistors enabled by the corresponding enable signals ENPm[1]-ENPm[X] or ENNm[1]-ENNm[X] (1≤m≤M) decreases, the resistance values increase, and the corresponding current magnitudes decrease.

In some embodiments, control circuit 310 is configured to generate some or all of enable signals ENPm[1]-ENPm[X] or ENNm[1]-ENNm[X] (1≤m≤M) configured to increase at least one IN-OUT resistance value or at least one VSSN-OUT resistance value, thereby matching at least one other corresponding IN-OUT resistance value and/or VSSN-OUT resistance value. In some embodiments, control circuit 310 is configured to generate enable signals ENPm[1]-ENPm[X] or ENNm[1]-ENNm[X] (1≤m≤M) configured to increase all but one IN-OUT resistance value and all but one VSSN-OUT resistance value, thereby matching each IN-OUT resistance value to a worst-case largest IN-OUT resistance value, and matching each VSSN-OUT resistance value to a worst-case largest VSSN-OUT resistance value.

Due to process control variations, values of resistance Rds of p-type transistors P1-PX and n-type transistors N1-NX, and of the DC resistance of inductor L1 are non-uniform across phase circuits 3PH1-3PHM. In some embodiments, control circuit 310 is configured to generate enable signals ENPm[1]-ENPm[X] and ENNm[1]-ENNm[X] (1≤m≤M) configured as discussed above to compensate for some or all of this non-uniformity, thereby reducing the variance between the magnitudes of currents I1-IM compared to a magnitude variance of currents I1-IM generated without compensation for the non-uniformity. In some embodiments, the configuration discussed above capable of reducing the variance between the magnitudes of currents I1-IM is referred to as a trim-based current balancing scheme.

In some embodiments, signal generator 316 is configured to generate enable signals ENPm[1]-ENPm[X] and ENNm[1]-ENNm[X] (1≤m≤M) based on a table 316T of trim data corresponding to each of power phase circuits 3PH1-3PHM as discussed above. In some embodiments, table 316T is referred to as a trim table. In various embodiments, table 316T is included in signal generator 316 or in a circuit (not shown) other than signal generator 316. In various embodiments, table 316T is stored in a memory, e.g., a non-volatile memory (NVM).

In some embodiments, voltage regulator 300VR includes one or more input terminals (not shown), in addition to input terminal PSSIT, configured to receive one or more signals configured to cause table 316T to be stored in voltage regulator 300VR, e.g., in signal generator 316. In some embodiments, load circuit 100L is configured to generate information usable to create and/or store table 316T in voltage regulator 300VR, and voltage regulator 300VR is configured to receive the information generated by load circuit 100L.

In some embodiments, by the configuration discussed above, control circuit 310 and power stage 320 are further capable of enabling measurements of resistance Rds of p-type transistors P1-PX and n-type transistors N1-NX, and of the DC resistance of inductor L1 of each of phase circuits 3PH1-3PHM. In operation, for a given phase circuit 3PHm, control circuit 310 generates signal pair PCTRLm/NCTRLm and signals ENPm[1]-ENPm[X] and ENNm[1]-ENNm[X] configured to couple nodes IN and OUT through inductor L1 and various one or more of p-type transistors P1-PX while measuring series resistance values, and to couple nodes VSSN and OUT through inductor L1 and various one or more of n-type transistors N1-NX while measuring series resistance values.

In some embodiments, voltage regulator 300VR and/or load circuit 100L are configured to generate the trim data stored in table 316T by performing resistance measurements as discussed above. In some embodiments, voltage regulator 300VR and/or load circuit 100L are configured to generate the trim data stored in table 316T by executing one or more operations of method 700, discussed below with respect to FIG. 7. In some embodiments, load circuit 100L includes some or all of an SOC configured to generate the trim data stored in table 316T, e.g., as part of an off-line power-on sequence or as part of an on-line operation.

In some embodiments in which phase circuits 3PH1-3PHM include thermal sensors TS, trim data stored in table 316T includes temperature-based scaling data, e.g., one or more process-based thermal coefficient of resistance values, corresponding to some or all of inductor L1, p-type transistors P1-PX, or n-type transistors N1-NX. In such embodiments, signal generator 316 is configured to generate enable signals ENPm[1]-ENPm[X] and ENNm[1]-ENNm[X] (1≤m≤M) based on the trim data adjusted in accordance with temperature information indicated by sensor signal TSS received from the thermal sensors TS and the scaling data.

By the configuration discussed above, voltage regulator 300VR is capable of controlling relative values of currents I1-IM output by phase circuits 3PH1-3PHM, thereby avoiding excessive local heating or overdesign to accommodate process and temperature variations. In some embodiments, voltage regulator 300VR is otherwise configured, e.g., by receiving one or more of enable signals ENPm[1]-ENPm[X] or ENNm[1]-ENNm[X] (1≤m≤M) from a circuit, e.g., load circuit 100L, external to voltage regulator 300VR, so as to be capable of controlling the relative values of currents I1-IM.

Based on the trim-based current balancing scheme discussed above, voltage regulator 300VR is capable of controlling relative values of currents I1-IM without feedback from one or more monitored values of currents I1-IM. In some embodiments, voltage regulator 300VR is free from including a circuit configured to monitor one or more of currents I1-IM or load current IL. Voltage regulator 300VR is thereby capable of having a reduced complexity compared to approaches in which relative values of phase currents are adjusted based on monitoring one or more output currents.

Figure 4:
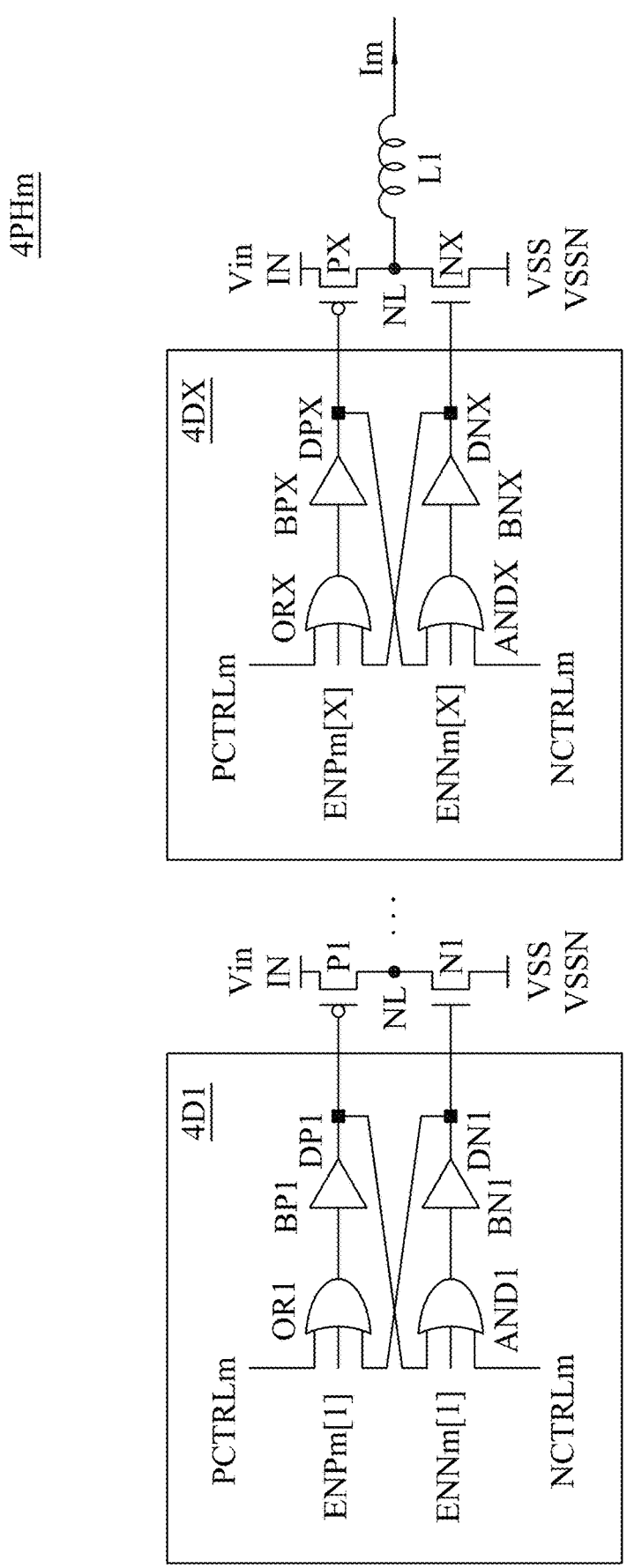
FIG. 4 is a schematic diagram of a phase circuit, in accordance with some embodiments.

FIG. 4 is a schematic diagram of a phase circuit 4PHm, in accordance with some embodiments. Phase circuit 4PHm is usable as one or more of phase circuits 3PH1-3PHM discussed above with respect to FIG. 3.

Phase circuit 4PHm includes node VSSN and inductor L1, discussed above with respect to FIG. 1, and nodes IN and NL, p-type transistors P1-PX, and n-type transistors N1-NX, discussed above with respect to FIG. 3. In some embodiments, phase circuit 4PHm includes thermal sensor TS (not shown), discussed above with respect to FIG. 3. Phase circuit 4PHm further includes driver circuits 4D1-4DX usable as corresponding driver circuits 3D1-3DX discussed above with respect to FIG. 3.

Driver circuits 4D1-4DX include corresponding OR gates OR1-ORX, AND gates AND1-ANDX, and buffers BP1-BPX and BN1-BNX. OR gates OR1-ORX include input terminals configured to receive control signal PCTRLm and corresponding enable signals ENPm[1]-ENPm[X], and coupled to output terminals of corresponding buffers BN1-BNX. AND gates AND1-ANDX include input terminals configured to receive control signal NCTRLm and corresponding enable signals ENNm[1]-ENNm[X], and coupled to output terminals of corresponding buffers BP1-BPX.

Buffers BP1-BPX include input terminals coupled to output terminals of corresponding OR gates OR1-ORX, and output terminals coupled to gates of corresponding p-type transistors P1-PX and configured to output corresponding driver voltages DP1-DPX discussed above with respect to FIG. 3. Buffers BN1-BNX include input terminals coupled to output terminals of corresponding AND gates AND1-ANDX, and output terminals coupled to gates of corresponding n-type transistors N1-NX and configured to output corresponding driver voltages DN1-DNX discussed above with respect to FIG. 3.

Driver circuits 4D1-4DX are thereby configured to receive control signal pair PCTRLm/NCTRLm and enable signals ENPm[1]-ENPm[X] and ENNm[1]-ENNm[X], and generate corresponding driver voltages DP1-DPX and NP1-NPX responsive to control signal pair PCTRLm/NCTRLm and enable signals ENPm[1]-ENPm[X] and ENNm[1]-ENNm[X]. Driver circuits 4D1-4DX are thereby capable of controlling p-type transistors P1-PX and n-type transistors N1-NX as discussed above with respect to FIG. 3, and phase circuit PH4*m* used as one or more of phase circuits 3PH1-3PHM is thereby capable of realizing the benefits discussed above with respect to voltage regulator 300VR and FIG. 3.

By including OR gates OR1-ORX configured to receive corresponding driver voltages DN1-DNX as inputs, and AND gates AND1-ANDX configured to receive corresponding driver voltages DP1-DPX as inputs, driver circuits 4D1-4DX are configured to output corresponding driver voltages DP1-DPX responsive to corresponding driver voltages DN1-DNX, and to output corresponding driver voltages DN1-DNX responsive to corresponding driver voltages DP1-DPX.

Based on switching delays in OR gates OR1-ORX and buffers BP1-BPX, falling edges of corresponding driver voltages DN1-DNX thereby prevent buffers BP1-BPX from outputting corresponding driver voltages DP1-DPX having low logical values until the corresponding switching delays have elapsed. Based on switching delays in AND gates AND1-ANDX and buffers BN1-BNX, rising edges of corresponding driver voltages DP1-DPX thereby prevent buffers BN1-BNX from outputting corresponding driver voltages DN1-DNX having high logical values until the corresponding switching delays have elapsed.

Phase circuit 4PHm is thereby configured to control dead-times in which node NL is decoupled from both of nodes IN and VSSN after being coupled to either one of nodes IN or VSSN. Dead-times prevent shoot-through scenarios in which node NL is simultaneously coupled to nodes IN and VSSN, thereby causing excessive current to flow based on a short circuit between nodes IN and VSSN. By controlling dead-times by design, phase circuit 4PHm is thereby capable of preventing excessive current flow without depending on control signal timing, thereby improving circuit reliability compared to approaches that depend on control signal timing.

In some embodiments, driver circuits 4D1-4DX do not include OR gates OR1-ORX coupled to buffers BN1-BNX and AND gates AND1-ANDX coupled to buffers BP1-BPX, and phase circuit 4PHm is not configured to control dead-times by design.

Figure 5:
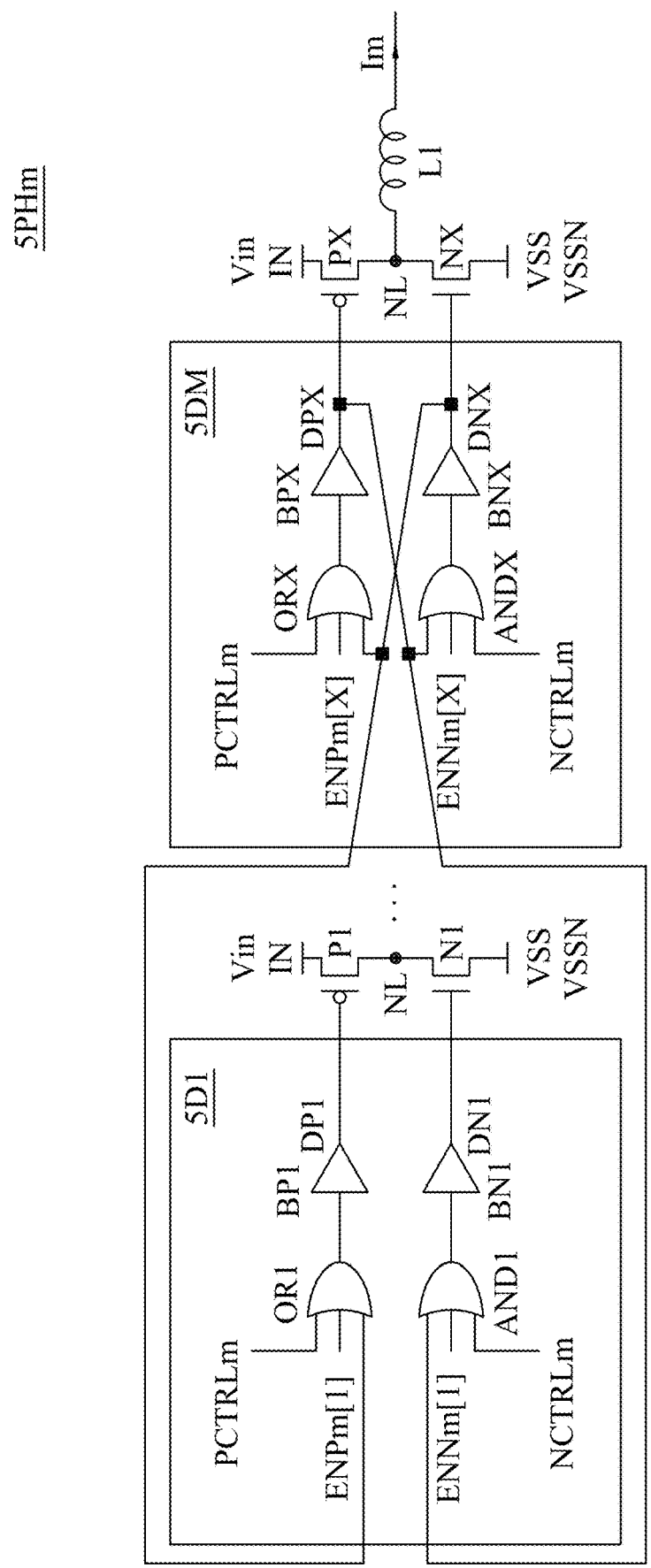
FIG. 5 is a schematic diagram of a phase circuit, in accordance with some embodiments.

FIG. 5 is a schematic diagram of a phase circuit 5PHm, in accordance with some embodiments. Phase circuit 5PHm is usable as one or more of phase circuits 3PH1-3PHM discussed above with respect to FIG. 3. Phase circuit 5PHm has a configuration that matches the configuration of phase circuit 4PHm discussed above, except that phase circuit 5PHm includes driver circuits 5D1-5DX instead of driver circuits 4D1-4DX.

In contrast to driver circuits 4D1-4DX, in which each OR gate OR1-ORX is coupled to a corresponding buffer BN1-BNX and each AND gate AND1-ANDX is coupled to a corresponding buffer BP1-BPX, driver circuits 5D1-5DX include OR gates OR1-ORX coupled to a single one of buffers BN1-BNX and AND gates AND1-ANDX coupled to a single one of buffers BP1-BPX.

In the non-limiting example depicted in FIG. 5, each OR gate OR1-ORX is coupled to buffer BNX, and each AND gate AND1-ANDX is coupled to buffer BPX. In various embodiments, each OR gate OR1-ORX is coupled to a buffer other than buffer BNX, and/or each AND gate AND1-ANDX is coupled to a buffer other than buffer BPX. In some embodiments, phase circuit 5PHm includes one or more switching circuits (not shown), e.g., a multiplexer, configured to selectively couple each OR gate OR1-ORX to one of buffers BN1-BNX and/or selectively couple each AND gate AND1-ANDX to one of buffers BP1-BPX.

By the configuration discussed above, phase circuit 5PHm is capable of controlling dead-times based on switching delays of one or more worst-case switching delays of driver circuits 5D1-5DX, thereby realizing the benefits discussed above with respect to phase circuit 4PHm.

Figure 6:
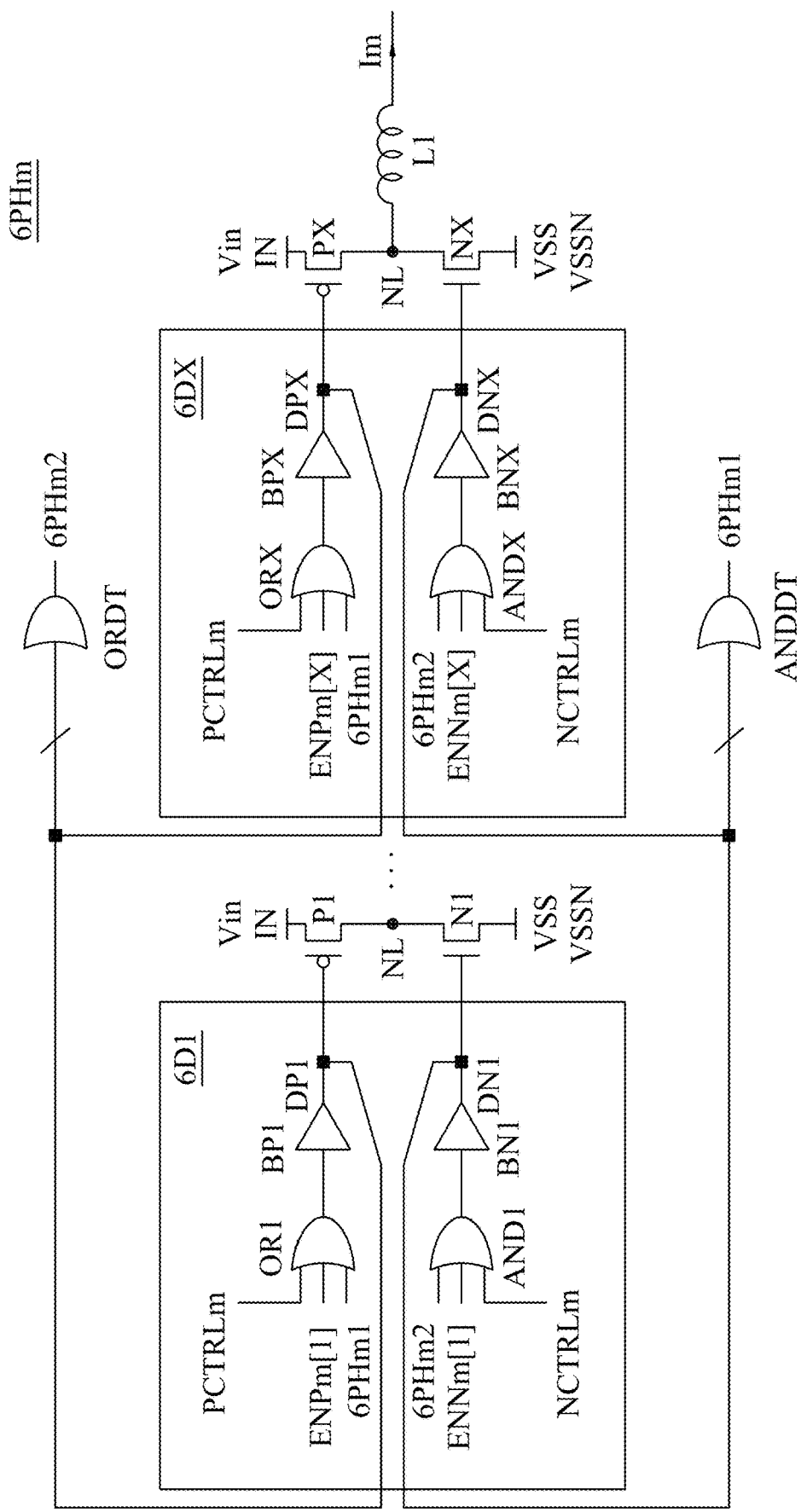
FIG. 6 is a schematic diagram of a phase circuit, in accordance with some embodiments.

FIG. 6 is a schematic diagram of a phase circuit 6PHm, in accordance with some embodiments. Phase circuit 6PHm is usable as one or more of phase circuits 3PH1-3PHM discussed above with respect to FIG. 3. Phase circuit 6PHm has a configuration that matches the configuration of phase circuit 4PHm discussed above, except that phase circuit 6PHm includes driver circuits 6D1-6DX instead of driver circuits 4D1-4DX, and includes an OR gate ORDT configured to generate a signal 6PHm2 and an AND gate ANDDT configured to generate a signal 6PHm1 as discussed below.

In contrast to driver circuits 4D1-4DX, in which each OR gate OR1-ORX is coupled to a corresponding buffer BN1-BNX and each AND gate AND1-ANDX is coupled to a corresponding buffer BP1-BPX, driver circuits 6D1-6DX include OR gates OR1-ORX coupled to an output terminal of AND gate ANDDT and AND gates AND1-ANDX coupled to an output terminal of OR gate ORDT. Output terminals of buffers BP1-BPX are coupled to input terminals of OR gate ORDT, and output terminals of buffers BN1-BNX are coupled to input terminals of AND gate ANDDT.

OR gate ORDT is thereby configured to output signal 6PHm2 based on a worst-case switching delay of driver circuits 6D1-6DX based on OR gates OR1-ORX and buffers BP1-BPX, and AND gate ANDDT is thereby configured to output signal 6PHm1 based on a worst-case switching delay of driver circuits 6D1-6DX based on AND gates AND1-ANDX and buffers BN1-BNX. Phase circuit 6PHm configured to control dead-times based on worst-case switching delays of driver circuits 6D1-6DX is thereby capable of realizing the benefits discussed above with respect to phase circuit 4PHm.

Figure 7:
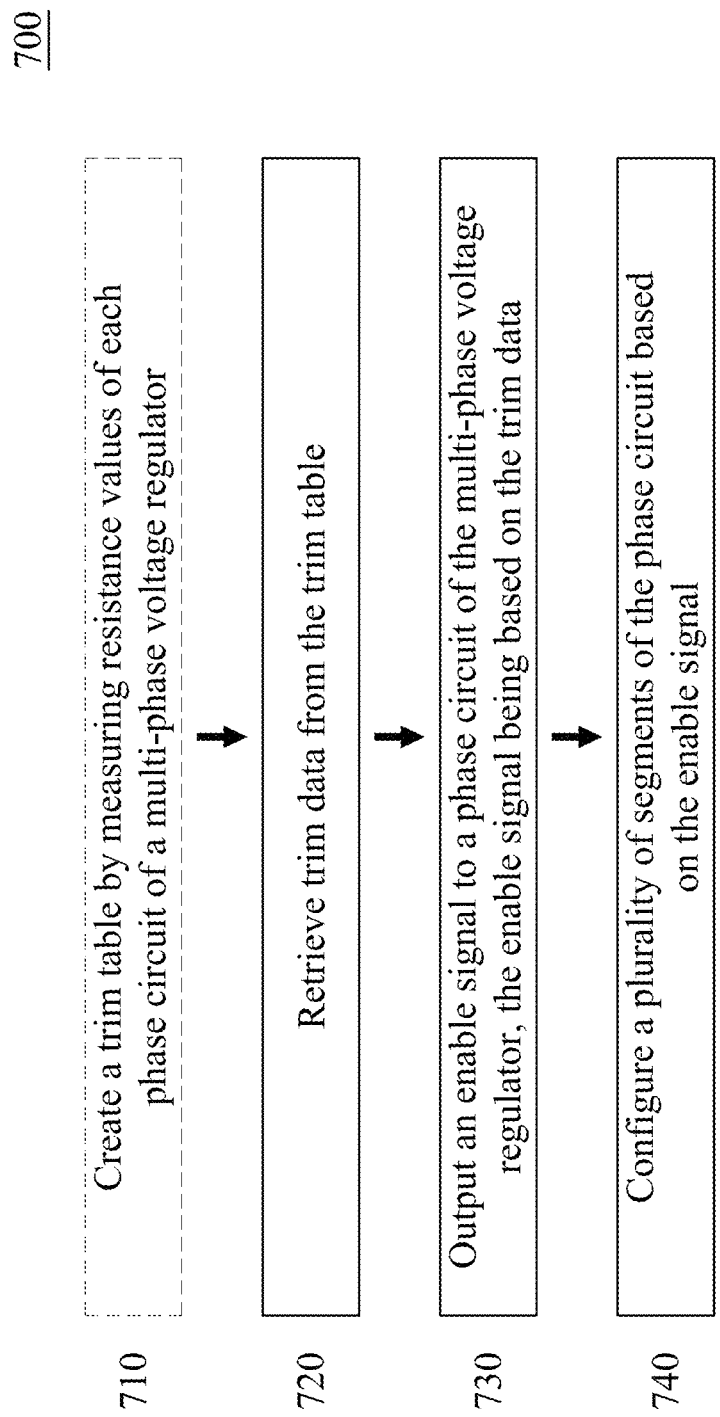
FIG. 7 is a flowchart of a method of regulating a voltage, in accordance with some embodiments.

FIG. 7 is a flowchart of method 700 of regulating a voltage, in accordance with some embodiments. Method 700 is usable with a voltage regulator circuit including a multiphase voltage regulator, e.g., voltage regulator circuit 300 including voltage regulator 300VR discussed above with respect to FIGS. 3-6.

The sequence in which the operations of method 700 are depicted in FIG. 7 is for illustration only; the operations of method 700 are capable of being executed in sequences that differ from that depicted in FIG. 7. In some embodiments, operations in addition to those depicted in FIG. 7 are performed before, between, during, and/or after the operations depicted in FIG. 7. In some embodiments, the operations of method 700 are a subset of operations of a method of operating an SOC.

At operation 710, in some embodiments, a trim table is created by measuring resistance values of each phase circuit of a plurality of phase circuits. Creating the trim table includes storing trim data for each phase circuit, the trim data being calculated to control a plurality of segments of each phase circuit based on the measured resistance values of the corresponding phase circuit. In some embodiments, calculating the trim data includes calculating the trim data to reduce a variance in current values among the plurality of phase circuits. In some embodiments, calculating the trim data includes calculating the trim data to increase one or more phase circuit resistance values such that one or more phase circuits have matching resistance values.

In various embodiments, creating the trim table includes creating a new trim table or updating an existing trim table. In some embodiments, creating the trim table includes storing the trim data in a memory, e.g., an NVM. In some embodiments, creating the trim table includes performing one or more operations of an SOC. In various embodiments, creating the trim table includes measuring the resistance values as part of a power-on sequence or as part of an on-line operation.

In some embodiments, creating the trim table includes creating trim table 316T discussed above with respect to FIG. 3. In some embodiments, creating the trim table includes using load circuit 100L, discussed above with respect to FIGS. 1 and 3, to create the trim table.

Measuring the phase circuit resistance values includes measuring a DC resistance value of an inductor. In various embodiments, measuring the phase circuit resistance values includes measuring Rds resistance values of one or more of a plurality of transistors coupled between the inductor and a power supply node and/or measuring Rds resistance values of one or more of a plurality of transistors coupled between the inductor and a reference, or ground node. In some embodiments, measuring the phase circuit resistance values includes measuring the DC resistance value of inductor L1 and/or one or more Rds resistance values of p-type transistors P1-PX and/or n-type transistors N1-NX, discussed above with respect to FIGS. 3-6.

In some embodiments, measuring the phase circuit resistance values includes applying a current and measuring a voltage across the output node and the power supply or reference node. In some embodiments, measuring the phase circuit resistance values includes applying a current and measuring a voltage across node OUT and the node IN or node VSSN, discussed above with respect to FIG. 3.

In various embodiments, measuring the phase circuit resistance values includes disabling one or more control signals, e.g., one or more PWM signals, used to control the phase circuits in operation. In some embodiments, disabling the one or more control signals includes disabling one or more of control signals PCTRL1-PCTRLM or NCTRL1-NCTRLM discussed above with respect to FIGS. 3-6.

In various embodiments, measuring the phase circuit resistance values includes configuring one or more enable signals, e.g., enable signals ENPm[1]-ENPm[X] and/or ENNm[1]-ENNm[X] discussed above with respect to FIGS. 3-6, to cause a predetermined subset of all of the plurality of segments of a phase circuit to be enabled.

In some embodiments, creating the trim table includes calculating the trim data based on the following steps, as illustrated by the non-limiting example presented below: For each phase circuit, for one and all of X segments enabled, measure resistance values between the power supply and output nodes and between the reference and output nodes; For the all segments enabled measurements, determine a largest phase circuit power supply/output node resistance value Rp and a largest reference/output node resistance value Rn;

For each phase circuit, calculate supply/output node resistance values R×p and reference/output node resistance values R×n for each segment based on:

$$K = 1/(2^X - 2) \quad (1)$$

$$R \times p = (R(\text{one segment}) - R(\text{all segments})) \times (1 + K) \\ (\text{power supply/output node}) \quad (2)$$

$$R \times n = (R(\text{one segment}) - R(\text{all segments})) \times (1 + K)(\text{reference/output node}) \quad (3)$$

For each phase circuit, calculate the trim data based on:

$$P\text{trim} = R \times p/(Rp + R \times p - R(\text{one segment}))(\text{power supply/output node}) \quad (4)$$

$$N\text{trim} = R \times n/(Rn + R \times n - R(\text{one segment}))(\text{reference/output node}) \quad (5)$$

The trim data are thereby calculated to cause each phase circuit of the multiphase voltage regulator to have power supply/output node and reference/output node resistance values that match those of the largest power supply/output node and reference/output node resistance values.

In a non-limiting example based on the embodiment depicted in FIG. 3, phase circuit resistance measurements are based on the following configuration of voltage regulator 300VR:

Each of M=2 phase circuits 3PH1 and 3PH2 includes X=4 segments based on a binary weighting scheme:
    Segment 1 includes driver circuit 3D1, p-type/n-type transistors P1/N1 having nominal Rds value $R_0$.
    Segment 2 includes driver circuit 3D2, p-type/n-type transistors P2/N2 having nominal Rds value $2 \times R_0$.
    Segment 3 includes driver circuit 3D3, p-type/n-type transistors P3/N3 having nominal Rds value $4 \times R_0$.

Segment 4 includes driver circuit 3D4, p-type/n-type transistors P4/N4 having nominal Rds value $8 \times R_0$.

The non-limiting example of measuring phase circuit resistance values includes the following operations:

Measure the total IN-OUT and VSSN-OUT resistance values of each of phase circuits 3PH1 and 3PH2 at the same temperature as represented in Table 1 (resistance values in milliohms).

| One segment enabled | Resistance Value | 3PH1 | 3PH2 |
|---|---|---|---|
| ENPm[1]-ENPm[4] = 1110<br>ENNm[1]-ENNm[4] = 0000 | IN-OUT | 80 | 108 |
| ENPm[1]-ENPm[4] = 1111<br>ENNm[1]-ENNm[4] = 0001 | VSSN-OUT | 55 | 78 |
| Four segments enabled | | | |
| ENPm[1]-ENPm[4] = 0000<br>ENNm[1]-ENNm[4] = 0000 | IN-OUT | 10 | 15 |
| ENPm[1]-ENPm[4] = 1111<br>ENNm[1]-ENNm[4] =1111 | VSSN-OUT | 8 | 13 |

TABLE 1

Determine the largest resistance values with all segments enabled:

IN-OUT = max(10,15) = 15 mohm for phase circuit 3PH2
VSSN-OUT = max(8,13) = 13 mohm for phase circuit 3PH2
Determine a per-segment Rds resistance value based on equations (1)-(3):

$K = 1/(2^4 - 2) = 0.07$
Rxp (3PH1) = (80 − 10) × (1 + 0.07) = 75 mohm
Rxn (3PH1) = (55 − 8) × (1 + 0.07) = 50.4 mohm
Rxp (3PH2) = (108 − 15) × (1 + 0.07) = 99.6 mohm
Rxn (3PH2) = (78 − 13) × (1 + 0.07) = 69.6 mohm
Calculate trim values based on equations (4) and (5):

Ptrim (3PH1) = 75/(15 − 80 + 75) = 7.5 (~8)
Ntrim (3PH1) = 50/(13 − 55 + 50) = 6.02 (~6)
Ptrim (3PH2) = 99.6/(15 − 108 + 99.6) = 15.1 (~15)
Ntrim (3PH2) = 69.6/(13 − 78 + 69.6) = 15.1 (~15)
Quantize the trim values to determine the trim data:

ENP1[4:1] = 1000 (14.4 mohm)
ENN1[4:1] = 0110 (13 mohm)
ENP2[4:1] = 0000 (15 mohm) (96% match of 3PH1)
ENN2[4:1] = 1111 (13 mohm) (100% match of 3PH1)

In this non-limiting example, the IN-OUT resistance of phase circuit 3PH2 is thereby increased to within 96% of the IN-OUT resistance of phase circuit 3PH1, and the VSSN-OUT resistance of phase circuit 3PH2 is thereby increased to approximately 100% of the VSSN-OUT resistance of phase circuit 3PH1.

In some embodiments, creating the trim table includes storing scaling data, e.g., one or more process-based thermal coefficient of resistance values, corresponding to one or more elements, e.g., the inductor, of the phase circuits.

At operation 720, trim data is retrieved from the trim table. Retrieving the trim data from the trim table includes retrieving the trim data corresponding to the plurality of segments of one or more phase circuits of the voltage regulator. In various embodiments, retrieving the trim data includes retrieving the trim data corresponding to a subset or all of the phase circuits of the voltage regulator.

In some embodiments, retrieving the trim data includes retrieving the trim data using control circuit 310 discussed above with respect to FIG. 3. In some embodiments, retrieving the trim data includes retrieving the trim data from trim table 316T discussed above with respect to FIG. 3.

In some embodiments, retrieving the trim data includes retrieving scaling data from the trim table. In some embodiments, retrieving the scaling data includes receiving temperature data, e.g., information in sensor signal TSS discussed above with respect to FIG. 3, from at least one of the phase circuits and adjusting the trim data based on the temperature data and the scaling data.

At operation 730, an enable signal is output to a phase circuit of the multi-phase voltage regulator, the enable signal being based on the trim data. In various embodiments, outputting the enable signal includes outputting the enable signal to a subset or all of the phase circuits of the voltage regulator.

In some embodiments, outputting the enable signal to the phase circuit includes outputting a control signal to the phase circuit. In some embodiments, outputting the enable signal to the phase circuit includes outputting one or more PWM signals to the phase circuit. In various embodiments, outputting the enable signal to the phase circuit includes outputting control signal CTRL to one or more of phase circuits 3PH1-3PHM discussed above with respect to FIG. 3, phase circuit 4PHm discussed above with respect to FIG. 4, phase circuit 5PHm discussed above with respect to FIG. 5, or phase circuit 6PHm discussed above with respect to FIG. 6.

In some embodiments, outputting the enable signal includes outputting the enable signal configured to increase a resistance value of the phase circuit. In some embodiments, outputting the enable signal includes outputting the enable signal configured to reduce a variance in phase circuit currents based on one or more non-uniform phase current resistance values.

In some embodiments, outputting the enable signal includes outputting a portion or all of enable signals ENPm[1]-ENPm[x] and ENNm[1]-ENNm[X] ($1 \leq m \leq M$). In some embodiments, outputting the enable signal includes outputting the enable signal to one or more of phase circuits 3PH1-3PHM discussed above with respect to FIG. 3, phase circuit 4PHm discussed above with respect to FIG. 4, phase circuit 5PHm discussed above with respect to FIG. 5, or phase circuit 6PHm discussed above with respect to FIG. 6.

At operation 740, a plurality of segments of the phase circuit is configured based on the enable signal. Configuring the plurality of segments includes enabling a predetermined subset or all of the segments of the phase circuit.

In some embodiments, configuring the plurality of segments includes increasing one or more resistance values of the phase circuit. In some embodiments, increasing the one or more resistance values includes reducing a number of transistors configured in parallel between an output node and a power supply or reference node. In some embodiments, reducing the number of transistors configured in parallel includes reducing the number of resistors having nominal resistance Rds values corresponding to a binary weighting scheme.

In various embodiments, configuring the plurality of segments includes configuring one or more of p-type transistors P1-PX and n-type transistors N1-NX and one or more of driver circuits 3D1-3DX of phase circuits 3PH1-3PHM discussed above with respect to FIG. 3, driver circuits 4D1-4DX of phase circuit 4PHm discussed above with respect to FIG. 4, driver circuits 5D1-5DX of phase circuit 5PHm discussed above with respect to FIG. 5, or driver circuits 6D1-6DX of phase circuit 6PHm discussed above with respect to FIG. 6.

In some embodiments, configuring the plurality of segments includes enabling a dead-time of a driver circuit, e.g., one of driver circuits 4D1-4DX discussed above with respect to FIG. 4, driver circuits 5D1-5DX discussed above with respect to FIG. 5, or driver circuits 6D1-6DX discussed above with respect to FIG. 6.

By executing some or all of the operations of method 700, a voltage regulator adjusts one or more output current values based on trim data, thereby obtaining the benefits discussed above with respect to voltage regulator circuit 300 and FIGS. 3-6.

In some embodiments, a voltage regulator includes an output node, a control circuit configured to receive a power state signal from a load circuit coupled to the output node, and output a control signal based on the power state signal, and a power stage including a plurality of phase circuits, each phase circuit of the plurality of phase circuits being coupled to the output node. The power stage is configured to enable a phase circuit of the plurality of phase circuits responsive to the control signal.

In some embodiments, a method of regulating a voltage incudes receiving a power state signal at a control circuit of a multi-phase voltage regulator and, in response to the power state signal, enabling a predetermined number of phases of the voltage regulator.

In some embodiments, a voltage regulator includes a control circuit configured to output a control signal and an enable signal, and a power stage including a plurality of phase circuits, each phase circuit of the plurality of phase circuits including a plurality of segments. The power stage is configured to, responsive to the control signal, enable a phase circuit of the plurality of phase circuits and, responsive to the enable signal, enable a segment of the plurality of segments of the phase circuit of the plurality of phase circuits.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage regulator comprising:
an output node;
a control circuit configured to receive a power state signal from a load circuit coupled to the output node and output a control signal based on the power state signal; and
a power stage comprising a plurality of phase circuits, each phase circuit of the plurality of phase circuits comprising:
one or more p-type transistors coupled to a power supply voltage node;
one or more n-type transistors coupled to a power supply reference node; and
an inductor comprising a first terminal coupled exclusively to the one or more p-type transistors and the one or more n-type transistors, and a second terminal coupled to the output node,
wherein
the power stage is configured to enable a phase circuit of the plurality of phase circuits responsive to the control signal,
the plurality of phase circuits is an entirety of phase circuits coupled to the control circuit,
the inductors of the plurality of phase circuits are an entirety of the inductors coupled to the output node, and
the inductor of each phase circuit of the plurality of phase circuits is a same inductor type.

2. The voltage regulator of claim 1, wherein the control circuit is configured to determine a number of enabled phase circuits of the plurality of phase circuits based on the power state signal and a mapping table.

3. The voltage regulator of claim 1, wherein the control signal comprises a pulse width modulation signal configured to generate an output voltage on the output node.

4. The voltage regulator of claim 3, wherein the control circuit is configured to
receive a sense voltage based on the output voltage, and
control the pulse width modulation signal based on the sense voltage.

5. The voltage regulator of claim 1, wherein each phase circuit of the plurality of phase circuits
is configured to control each of the one or more p-type transistors and one or more n-type transistors based on the control signal and on an enable signal received from the control circuit.

6. The voltage regulator of claim 5, wherein the control circuit is configured to generate the enable signal based on a trim table.

7. The voltage regulator of claim 1, wherein
the control circuit and the load circuit are located on a first integrated circuit (IC) die, and
the phase circuit of the plurality of phase circuits is located on a second IC die.

8. A method of regulating a voltage, the method comprising:
receiving a power state signal at a control circuit of a multi-phase voltage regulator; and
in response to the power state signal, enabling a predetermined number of phases of the voltage regulator,
wherein
each phase of an entirety of the phases of the voltage regulator comprises:
one or more p-type transistors coupled to a power supply voltage node;
one or more n-type transistors coupled to a power supply reference node; and
a magnetic inductor comprising a first terminal coupled exclusively to the one or more p-type transistors and the one or more n-type transistors, and a second terminal coupled to an output node, and
the inductors of the phases are an entirety of the inductors coupled to the output node.

9. The method of claim 8, wherein the receiving the power state signal comprises receiving the power state signal comprising an indication of a power level of a load circuit configured to receive an output voltage of the voltage regulator.

10. The method of claim 8, wherein the enabling the predetermined number of phases of the voltage regulator comprises retrieving the predetermined number from a mapping table based on the power state signal.

11. The method of claim 10, wherein the retrieving the predetermined number from the mapping table comprises the predetermined number multiplied by a predetermined current per phase of the voltage regulator being greater than or equal to a load current level indicated by the power state signal.

12. The method of claim 10, further comprising creating the mapping table by performing a simulation of a load circuit configured to generate the power state signal.

13. The method of claim 8, wherein the enabling the predetermined number of phases of the voltage regulator comprises outputting a predetermined portion of a master control signal to generate a control signal.

14. A voltage regulator comprising:
a control circuit configured to output a control signal and an enable signal; and
a power stage comprising a plurality of phase circuits, wherein
each phase circuit of the plurality of phase circuits comprises an inductor and a plurality of segments, and
each segment of the plurality of segments of each phase circuit of the plurality of phase circuits comprises first and second transistors coupled to a first terminal of the inductor, wherein the first terminal of the inductor is exclusively coupled to the first and second transistors of each segment of the plurality of segments of each phase circuit of the plurality of phase circuits,
wherein the power stage is configured to
responsive to the control signal, enable a phase circuit of the plurality of phase circuits, and
responsive to the enable signal, enable a segment of the plurality of segments of the phase circuit of the plurality of phase circuits.

15. The voltage regulator of claim 14, wherein
the first transistor of each segment of the plurality of segments of each phase circuit of the plurality of phase circuits is a p-type transistor configured to selectively couple the first terminal of the inductor to a power supply node, and
the second transistor of each segment of the plurality of segments of each phase circuit of the plurality of phase circuits is an n-type transistor configured to selectively couple the first terminal of the inductor to a reference node.

16. The voltage regulator of claim 14, wherein the control circuit is configured to generate the enable signal configured to cause the power stage to control a resistance value of a first phase circuit of the plurality of phase circuits based on a predetermined resistance value.

17. The voltage regulator of claim 16, wherein the control circuit is configured to generate the enable signal configured to cause the power stage to control the resistance value of the first phase circuit of the plurality of phase circuits by enabling a predetermined subset of the plurality of segments.

18. The voltage regulator of claim 14, wherein the control circuit is configured to generate the enable signal based on a trim table.

19. The voltage regulator of claim 18, wherein
each phase circuit of the plurality of phase circuits comprises a thermal sensor configured to generate a sensor signal, and
the control circuit is configured to generate the enable signal based on the sensor signal and temperature-based scaling data in the trim table.

20. The voltage regulator of claim 14, wherein the control circuit is configured to receive a power state signal from a load circuit, and generate the control signal responsive to the power state signal.

* * * * *